United States Patent [19]
Saito et al.

[11] Patent Number: 5,082,195
[45] Date of Patent: Jan. 21, 1992

[54] REEL TABLE SHIFTING DEVICE

[75] Inventors: Tsukasa Saito; Hiroshi Kiriyama, both of Kanagawa; Toshiaki Noguchi, Tokyo, all of Japan

[73] Assignee: Sony Corporation, Tokyo, Japan

[21] Appl. No.: 513,961

[22] Filed: Apr. 24, 1990

[30] Foreign Application Priority Data

Apr. 27, 1989 [JP] Japan .................................. 1-108164

[51] Int. Cl.⁵ .............................................. G11B 15/00
[52] U.S. Cl. ........................................ 242/199; 360/94
[58] Field of Search ............... 242/197, 198, 199, 200; 360/94

[56] References Cited

U.S. PATENT DOCUMENTS

| 4,664,337 | 5/1987 | Shiratori | 242/199 |
| 4,782,408 | 11/1988 | Inoue et al. | 360/94 X |
| 4,787,572 | 11/1988 | Rademacher | 360/94 X |
| 4,853,805 | 8/1989 | Baranski | 360/94 |
| 4,864,449 | 9/1989 | Froue et al. | 360/94 X |
| 4,873,593 | 10/1989 | Baranski | 360/94 X |
| 4,903,149 | 2/1990 | Hasegawa et al. | 360/94 X |
| 4,918,550 | 4/1990 | Baranski | 360/94 |

FOREIGN PATENT DOCUMENTS 2722478 12/1977 Fed. Rep. of Germany ...... 242/198

Primary Examiner—Daniel P. Stodola
Assistant Examiner—John P. Darling
Attorney, Agent, or Firm—Alvin Sinderbrand; William S. Frommer

[57] ABSTRACT

A reel table shifting device is adapted to accommodate tape cassettes in a range of differant sizes. The reel table shifting device includes a pair of reel tables adapted to support the tape cassette, a driving mechanism for moving the reel tables between a plurality of mount positions such that the cassette can be mounted at one of the mount positions depending upon the size of the cassette, and an intermediate stopper mechanism operative to arrest movement of the reel tables in a precise predetermined intermediate mount position independent of the direction of movement of the reel tables towards such intermediate mount position.

37 Claims, 15 Drawing Sheets

REEL TABLE SHIFTING DEVICE

BACKGROUND OF THE INVENTION

1. Field of the Invention

The present invention relates generally to a reel table shifting device, and, more particularly, is directed to a movement table positioning mechanism for a reel table shifting device to be used in a video tape recording and/or reproducing apparatus for accommodating tape cassettes of different sizes.

2. Background of the Invention

FIG. 1 shows a cassette-type video tape recorder which is capable of loading a cassette 101 of relatively large size, a cassette 102 of intermediate size, and a cassette 103 of relatively small size. In order to accommodate these three different-sized cassettes, each reel table is moved by a reel table shifting device between a position $P_1$ for supporting a large-sized cassette 101 ("L position"), a position $P_2$ for supporting an intermediate-sized cassette 102 ("I position"), and a position $P_3$ for supporting a small-sized cassette 103 ("S position").

A. Proposed Efforts to Develop a Movement Table Positioning Mechanism for a Reel Table Shifting Device Proposed approaches for movement table positioning mechanisms used in reel table shifting devices which have been proposed by persons having an obligation to assign to the assignee of the present application, and which have been considered by the assignee of the present application are illustrated in FIGS. 2–6. These proposed approaches are merely referred to herein for the purpose of explaining problems encountered in these proposed approaches which have been overcome by the present invention.

FIG. 2 illustrates one proposed approach for a movement table positioning mechanism employed in a reel table shifting device for moving a reel table 104 from either the large-sized tape cassette mount position $P_1$ or the small-sized tape cassette mount position $P_3$ to the intermediate-sized tape cassette mount position $P_2$ such that the reel table is retained in the intermediate-sized tape cassette mount position $P_2$. This approach includes an intermediate stopper 106 which reciprocally moves into the path of movement of the movement table 105 which supports the reel table 104. As shown in FIG. 2, an intermediate stopper contact portion 107 is capable of engagement with the intermediate stopper 106 to arrest movement of the movement table, and hence, the reel table, in the tape cassette intermediate mount position $P_2$. The intermediate stopper 106 is reciprocally moved by an intermediate stopper operation mechanism 110 including an electromagnetic solenoid 108, a solenoid plunger 109 and a coil spring (not shown).

When the movement table 105 is moved from the position $P_1$ for supporting a relatively large-sized cassette, one side portion 107a of the intermediate stopper contact portion 107 contacts a side edge 106a of the intermediate stopper 106, as is illustrated in FIG. 2. When the movement table 105 is moved from the position $P_2$ for supporting a relatively small-sized cassette, the other side portion 107b of the intermediate stopper contact portion 107 contacts the other side edge 106b of the intermediate stopper 106. Thus, the proposed approach for a movement table positioning mechanism, as illustrated in FIG. 2, causes the movement table 105 to have different intermediate positions, as shown in full lines and in dot-dash lines, respectively, when the table 105 is moved toward the intermediate positions from the relatively large-sized cassette mount position $P_1$ and the relatively small-sized cassette mount position $P_2$. Such intermediate positions of the movement table 105 are spaced by the distance $d_1$ between the side edges 106a and 106b of the intermediate stopper 106, and the distance $d_2$, between the side portions 107a and 107b of the intermediate stopper contact portion 107.

In order to avoid the dislocation described above, the assignee of the present invention has also considered a movement table positioning mechanism for a reel table shifting device, as is shown in Figs. 3 and 4, and in which there are provided an intermediate stopper 111 for the L position side and an intermediate stopper 112 for the S position side. The intermediate stoppers 111 and 112 are spaced apart in the moving direction of the movement table 105. When the movement table 105 is moved from the L position side to the intermediate cassette mount position, the intermediate stopper 111 for the L position side is reciprocally moved to contact the surface 107a at one side of the intermediate stopper contact portion 107 and retain the movement table in the intermediate cassette mount position (FIG. 3). When the movement table 105 is moved from the S position side, the intermediate stopper 112 for the S position side is reciprocally moved to contact with the surface 107b of the intermediate stopper contact portion 107 and thereby retain the movement table in substantially the same intermediate cassette mount position (FIG. 4).

Another movement table positioning mechanism for a reel table shifting device considered by the assignee of the present application to prevent the mislocation described with reference to FIG. 2 is illustrated in FIGS. 5 and 6. In the arrangement 15 illustrated by FIGS. 5 and 6, the intermediate stopper contact portion 107, when being moved from the S position side to the intermediate cassette mount position, is first moved past such intermediate position without being contacted by the retracted intermediate stopper 106 (FIG. 5). Then, the movement table 105 is returned toward the S position side and, during such return movement, the intermediate stopper 106 is extended so that one side portion 107a of the intermediate contact portion 107 contacts a side edge 106a (FIG. 6) of the intermediate stopper 106 to dispose the movement table 105 in precisely the same intermediate cassette mount position as it would attain if it was moved thereto from the L position side.

The movement table positioning mechanism for a reel table shifting device illustrated in FIGS. 3 and 4 was found to be disadvantageous in that it was relatively expensive to provide the two required intermediate stoppers 111 and 112. Furthermore, the proposed movement table positioning mechanism of FIGS. 5 and 6 was found to be disadvantageous since a longer access time is required for the intermediate stopper contact portion 107 to contact the stopper 106 when the movement table 105 is moved from the S position side. Furthermore, the approach illustrated in FIGS. 5 and 6 requires a more sophisticated movement control system for the movement table 105 since the intermediate stopper contact portion 107 is initially moved past the intermediate cassette mount position without contacting the stopper 6 and then is returned to the intermediate cassette mount position for only then contacting the intermediate stopper 6.

B. Prior Direction Sensors for Reel Table Shifting Device

A prior art reel table shifting device of a tape disclosed in detail in U.S. Pat. No. 4,664,337, is shown in FIG. 7 to comprise a pair of movement tables 120 and 121 which support reel tables 122 and 123, respectively. The movement tables 120 and 121 are slidably mounted on guide members 124 and 125 which converge upwardly as viewed on FIG. 7. The movement tables 120 and 121 are each movable between a large-sized cassette mount position $P_1$ and a small-sized cassette mount position $P_2$.

A portion of each of the movement tables 120 and 121 is operatively connected to a shift motor 126 by a transmission that includes a limiter spring 127, a connector 128 and a movement table driving mechanism 129. The driving mechanism 129 is shown to include a belt and pulley transmission 129a driving a shaft 129b from the motor 126, and gearing 129c through which the shaft 129b drives worms 129d which are parallel with the guide members 124 and 125 and threadably engaged by the connectors 128. As is shown in FIG. 7, when the motor 126 is rotated in one direction, the movement tables 120 and 121 move in directions away from each other. When the tables 120 and 121 are so moved, first stopper abutting portions 130 and 131 provided on the movement tables 120 and 121, respectively, abut first stop members 132 and 133 when the moveable tables attain their relatively large-sized cassette mount positions $P_1$. As the motor 126 is further rotated, only the connectors 128 operatively connected to movement tables through springs 127 are moved. The movement tables remain stationary as they are already positioned in the relatively large-sized cassette mount positions $P_1$. During this further rotation of the drive motor, the limiter springs 127 are compressed. Accordingly, the first stopper abutting portions 130 and 131 are urged against the first stop members 132 and 133 by the biasing force applied by the limiter springs 127 such that the movement tables 120 and 121 are retained in the relatively large-sized cassette mount positions $P_1$.

Furthermore, when the motor 126 is rotated in a reverse direction, the movement tables 120 and 121 are moved towards each other, and second stopper abutting portions 134 and 135 on the movement tables 120 and 121 abut a second stop member 136 mounted on the chassis such that the movement tables 120 and 121 are positioned at the relatively small-sized cassette mount positions $P_2$. Additionally, if the motor 126 rotates further, only the connectors 128 operatively connected to the respective movement tables are further moved, while the movement tables remain stationary as they are already positioned in their relatively small-sized cassette mount positions. During further rotation of the drive motor, the limiter springs 127 are again compressed. The second stopper abutting portions 134 and 135 are urged against the second stop member 136 by the biasing forces applied by the limiter springs 127 such that the movement tables 120 and 121 are retained at their relatively small-sized cassette mount positions $P_2$.

In the reel table shifting device illustrated in FIG. 7, position control of the movement tables 120 and 121, which, in turn, controls the positions of the reel tables 122 and 123, respectively, is performed only by potentiometers or position sensors associated with the driving circuit of the motor 126. In employing these sensors in the proposed approach for a movement table positioning mechanism having an intermediate position, as in FIG. 2, the following problems were discovered. If a potentiometer is used as the position control, in certain instances, the limiter springs are not adequately compressed when the movement tables are moved to the relatively large-sized cassette mount positions $P_1$. Further, if position sensors are also used as the position control, in order to move the movement tables to desired positions where the sensors are not actuated, the movement tables have to be moved to positions where sensors can be actuated for detecting the positions of the movement tables. Thereafter, the movement tables are moved to the desired positions. Thus, by using position sensors in the position control for a movement table positioning mechanism, the movement 15 tables were required to perform excess motion, and additionally, undue delay was caused if the movement tables were initially in a position where the sensors could not be actuated.

C. Proposed Movement Table Driving Mechanisms

In one of the proposed approaches for a reel table shifting device considered by the assignee of the present invention, the driving mechanism for the movement tables included timing pulleys which were mounted on rotary shafts extending from pair of worm wheels which were in meshing engagement with opposed sides of a worm rotatably connected to the drive motor. The movement tables were then moved by a pair of timing belts running difficult to ensure exact alignment of the pair of worm wheels and the timing pulleys with respect to the worm to thereby ensure synchronous movement of the movement tables.

D. Servo Motor Control Circuit

In the proposed approaches considered by the assignee of this application and which are illustrated in FIGS. 2-6, it is necessary to move the movement tables either away from each other or toward each other according to the size of the tape cassette and to position and fix the movement tables at the respective tape cassette mount positions. In these proposed movement table positioning mechanisms for a reel table shifting device, the movement tables are operatively connected to the drive mechanism by the limiter springs 127 on FIG. 7. After an intermediate stopper contact portion, such as is indicated at 107 in FIG. 2, abuts against a stopper 106, and the movement tables are positioned in the desired cassette mount position, the limiter springs are deflected or compressed. The intermediate stopper contact portion is then urged against the stopper by the biasing force applied by the limiter spring such that the respective movement table is positioned and fixed in the desired tape cassette mount position. In these proposed movement tables positioning mechanisms, the drive motor has been controlled to operate at a constant speed in order to rapidly move the movement tables to their desired position.

Due to the operation of the motor at a constant speed, when the movement tables reach the desired cassette mount position, the power supply of the motor is turned off, but, due to inertia, movement continues and the limiter springs are excessively compressed and thereby bent so that the driving mechanism was found to be unreliable. Such unreliability results from dispersion of the reel table positions due to the compression of the limiter springs, increased inertia forces generated when the reel tables rotate at a high speed, and difficulty in positively urging the intermediate stopper contact portion against the intermediate stopper.

OBJECTS AND SUMMARY OF THE INVENTION

Accordingly, it is an object of the present invention to provide a reel table shifting device which can avoid the above problems encountered in the prior art.

More specifically, it is an object of the present invention to provide an improved movement table position mechanism for a reel table shifting device.

It is also an object of the present invention to provide a movement table positioning mechanism for a reel table shifting device which prevents mislocation of the movement tables when they are moved from relatively large-sized cassette mount positions or relatively small-sized cassette mount positions to intermediate-sized cassette mount positions.

It is another object of the present invention to provide a movement table positioning mechanism for a reel table shifting device which reduces the access time required for the movement tables to be retained in their intermediate-sized cassette mount positions.

It is a further object of this invention to provide a movement table positioning mechanism for a reel table shifting device which is relatively inexpensive to manufacture.

It is yet another object of the present invention to provide a movement table positioning mechanism for a reel table shifting device wherein movement of the movement tables is arrested in precise predetermined intermediate mount positions independent of the directions of movement of the movement tables toward their intermediate mount positions.

It is yet a further object of this invention to provide a reel table shifting device having sensing mechanisms which determine whether the movement tables have been moved from the large-sized cassette mount positions or the small-sized cassette mount positions to the intermediate-sized cassette mount positions.

It is yet another object of the present invention to provide a reel table shifting device having an adjustment mechanism which ensures synchronous movement of the movement tables.

It is yet a still further object of this invention to provide a servo motor control device for a movement table positioning mechanism employed in a reel table shift device which ensures that an intermediate stopper contact portion associated with each reel table will be urged against a respective intermediate stopper with a uniform pressing force.

According to an aspect of the present invention, a reel table shifting device is adapted to receive a tape cassette which can be in a range of different sizes. The reel table shifting device includes a pair of reel tables adapted to support the tape cassette. The reel tables are supported on corresponding movement tables, and a driving mechanism is provided for moving the reel tables among a plurality of mount positions so that the cassette can be mounted on the reel tables at one of the mount positions depending upon the cassette size. Furthermore, the reel table shifting device includes an intermediate stopper mechanism operative to arrest movement of each of the reel tables in a respective precise predetermined intermediate mount position independent of the direction of movement of the respective reel table towards the intermediate mount position.

In accordance with another feature of the present invention, direction sensors are provided which detect the directions of movement of the movement tables toward their intermediate cassette mount positions.

In accordance with a further feature of this invention, an aligning mechanism is provided for ensuring opposed synchronous movement of the movement tables supporting the reel tables. This aligning mechanism includes corresponding slits which are provided in the top ends of a pair of rotary shafts which are frictionally coupled to worm gears in meshing engagement with a worm driven by the drive motor. The shafts drive timing pulleys which engage timing belts for moving the movement tables. By independently adjusting the shafts by means of a flat steel plate engaged in the respective slits, the respective timing pulleys, may be angularly adjusted relative to the respective worm gears for measuring proper synchronous movement of the movement tables.

In accordance with yet another feature of this invention, a servo motor control circuit is provided which controls the drive mechanism at a constant speed until a limiter spring starts to flex, whereupon, a sensor detects this flexing and the drive motor is controlled to operate at a constant torque.

The above, and other objects, features and advantages of the present invention, will become apparent in the following detailed description, which is to be read in conjunction with the accompanying drawings, and in which like reference numerals designate the same elements in the several views.

BRIEF DESCRIPTION OF THE DRAWINGS

FIGS. 10-14 are explanatory views illustrating operation of a movement table positioning mechanism incorporated within the reel table shifting device of FIG. 8, and wherein:

FIG. 10 shows the condition of the movement table positioning mechanism during movement of the table from the relatively large-sized cassette mount positions to an intermediate-sized cassette mount position;

FIG. 11 is a view similar to that of FIG. 10, but with the movement table shown retained in the intermediate cassette mount position;

FIG. 12 is a view showing the movement table being moved from the relatively small-sized cassette mount position to the intermediate cassette mount position;

FIG. 13 is a view similar to that of FIG. 12, but showing the movement table retained in the intermediate cassette mount position;

FIG. 14 is an enlarged view combining the illustrations of FIGS. 11 and 13;

DETAILED DESCRIPTION OF PREFERRED EMBODIMENTS

Figure 1:
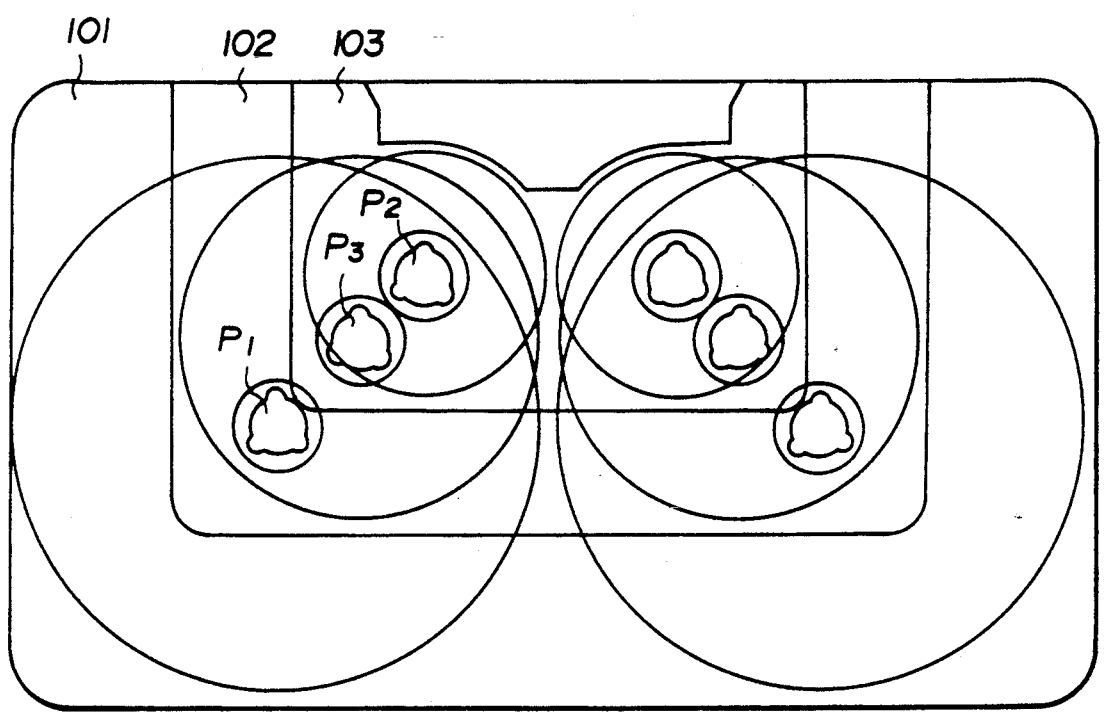
FIG. 1 is a diagrammatic top plan view illustrating the relationship between a plurality of reel table mount positions and tape cassettes of relatively large size, relatively small size, and an intermediate size for mounting at three cassette mount positions, respectively.
Figure 5:
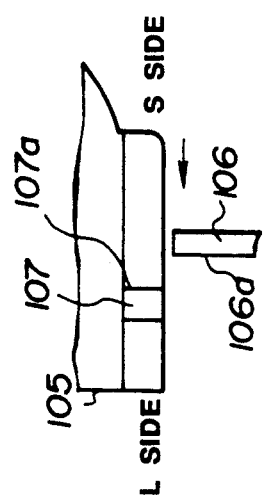
FIGS. 2-6 are explanatory views illustrating movement table positioning mechanisms for reel table shifting devices which have been considered by the assignee of the present application but not publicly disclosed.
Figure 6:
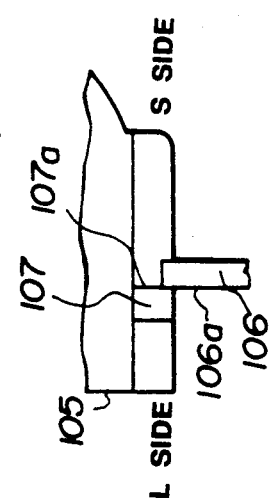
Figure 3:
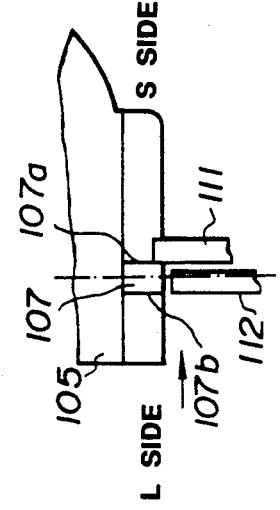
Figure 4:
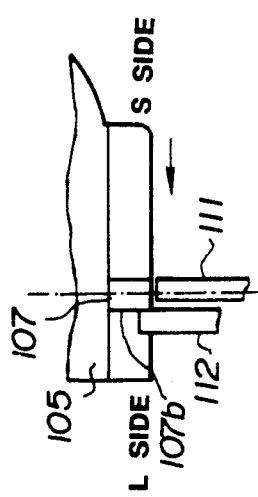
Figure 2:
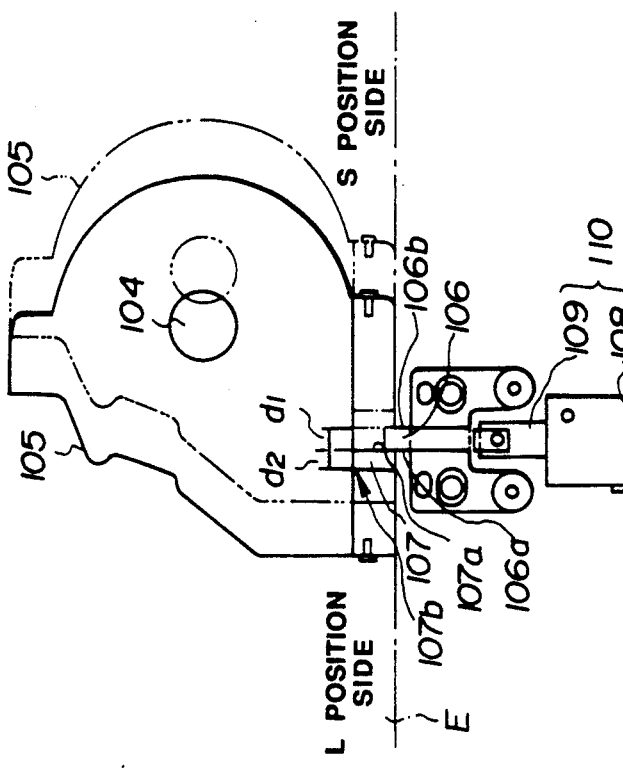
Figure 7:
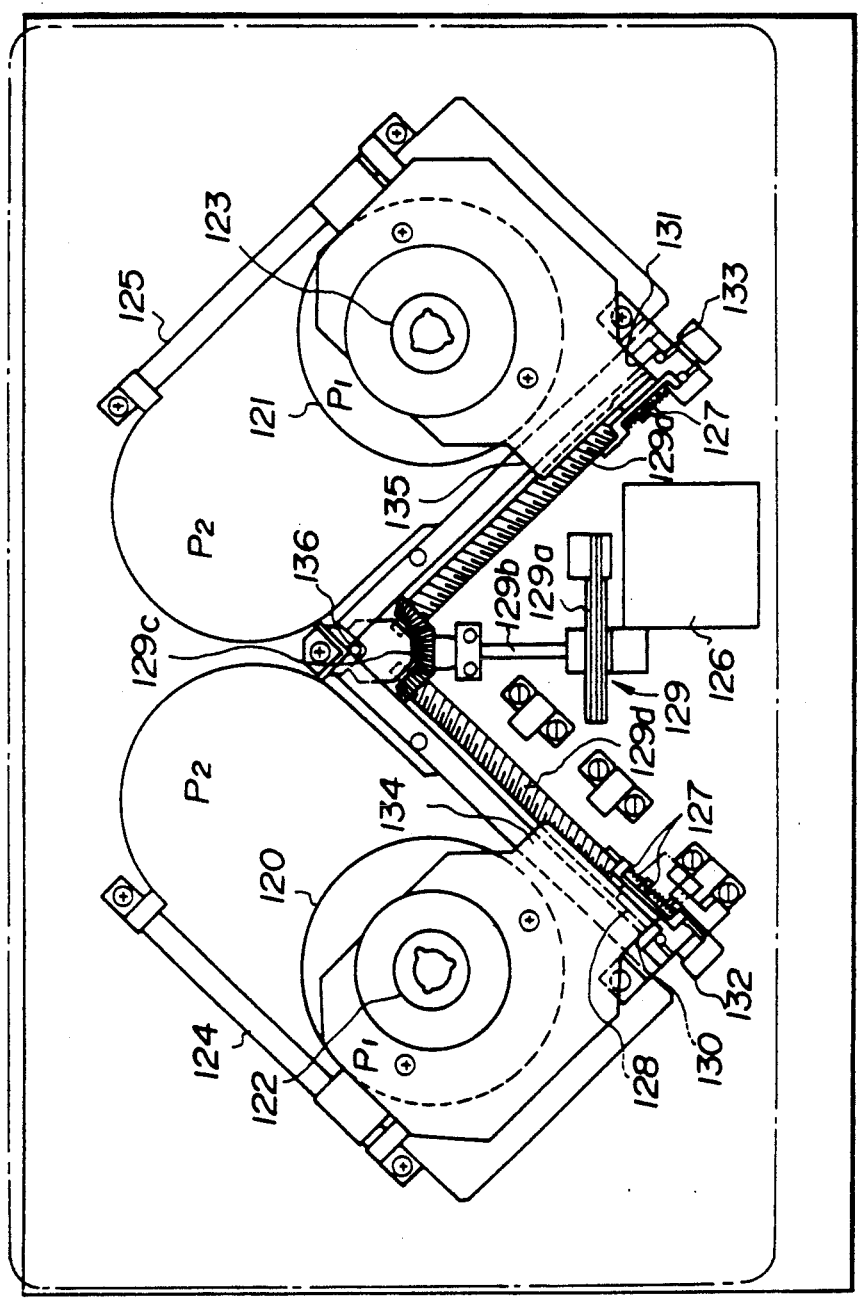
FIG. 7 is a top plan view showing an example of a reel table shifting device employed according to the prior art.

A reel table shifting device I or similar apparatus according to an embodiment of the present invention will now be described in detail with reference to FIG. 8. In the embodiment shown in FIG. 8, the reel table shifting device I includes a pair of movement tables 3 and 4 which are moved in opposed relationship to each other along a pair of guide members 5 and 6 by means of a movement table driving mechanism 7. Since the movement tables 3 and 4 support reel tables 2a and 2b (See FIG. 9), the reel tables move in unison with the movement tables. The guide members 5 and 6 define converging paths of travel for the movement tables 3 and 4.

The movement tables 3 and 4 are moved along the respective paths of travel between relatively large-sized cassette mount positions $P_1$, relatively small-sized cassette mount position $P_2$, and intermediate cassette mount positions $P_3$ located between cassette mount positions $P_1$ and $P_2$. When the movement tables 3 and 4 are moved to the relatively large-sized cassette mount positions $P_1$ (also referred to herein as the "L positions"), first stopper contact portions 8 and 9 provided along side portions 81 of the movement tables 3 and 4, respectively, contact first stop members 10 and 11 arranged on a chassis. In this position, the movement tables 3 and 4 are retained in their large-sized cassette mount positions. As illustrated in FIG. 8, when the movement tables are moved to the relatively large-sized cassette mount positions $P_1$, they move away from each other toward the distal ends of the guide members 5 and 6. When the movement tables 3 and 4 are moved to the relatively small-sized cassette mount positions $P_2$ (also referred to herein as the "S positions"), second stopper contact portions 2 and 13 provided in other side portions 82 of the movement tables 3 and 4, as particularly shown on FIG. 14 in respect to table 3, contact second stop members 14 and 15 arranged on the chassis. Thus, the movement tables 3 and 4 are retained in the relatively small-sized cassette mount positions. As shown in FIG. 8, when the movement tables 3 and 4 are moved to the relatively small-sized cassette mount positions $P_2$, they approach each other toward the proximal ends of the guide members 5 and 6.

In accordance with one of the general objects of this invention, a movement table positioning mechanism 16 is provided to precisely position and secure each of the movement tables 3 and 4 (and the corresponding reel tables 2a, 2b) in the respective intermediate-sized tape cassette mount positions $P_3$ when the movement table is moved thereto from either of the L or S position sides. As shown in FIG. 8, each movement table positioning mechanism 16 is positioned substantially intermediate the respective one of the first stop members 10 and 11 and the respective one of the second stop members 14 and 15. Each movement table positioning mechanism 16 generally includes an intermediate stopper 17 mounted on the chassis, and a pivotable stopper catch 18 which is mounted on the respective one of the movement tables 3 and 4.

Figure 14:
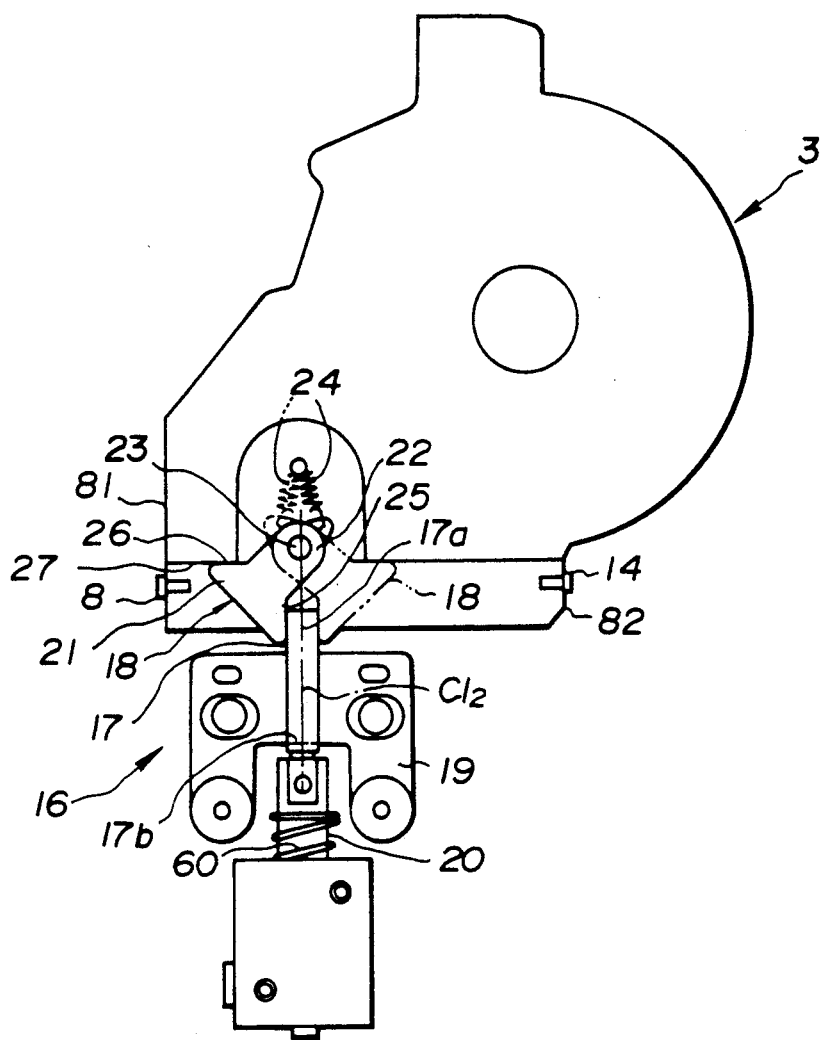

As shown particularly in FIG. 14, the intermediate stopper 17 is in the form of a reciprocally-moveable bolt, and is slidably mounted in a bearing member 19. The top end portion 17a of the intermediate stopper 17 projects into the plane of movement of the movement table 3 or 4 due to the biasing force applied by a coil spring 60 to a solenoid plunger 20 which is operatively connected to the base portion 17b of the intermediate stopper 17. When a retracting force is applied to the solenoid plunger 20, the intermediate stopper 17 is withdrawn from the plane of movement of the respective movement table 3 or 4.

The pivotable stopper catch 18 is generally of a symmetrical Y-shape and includes a head portion 21 and a stem portion 22. The head portion 21 includes first and second angled side surfaces 25 and 26 along the opposite side edges thereof. Accordingly, the head portion 21 generally has the form of an isosceles triangle. The top end portion of the stem portion 22 of the stopper catch 18 is rockably mounted on the upper surface of the movement table 3 by means of a pivot shaft 23.

As shown in FIGS. 10-13, a tension coil spring 24 is connected with the top end of the stem portion 22. The spring 24 urges the stopper catch 18 to a position shown on FIGS. 10 and 12 in which a longitudinal central axis $cl_1$ of the stem portion 22 extends generally normal to the moving direction of the movement table 3 or 4. In such position of the catch 18, the first and second angled surfaces 25 and 26 are inclined oppositely at predetermined angles from the longitudinal center line $cl$, of the stopper catch 18, and hence from the moving direction of the table 3 or 4.

Figure 10:
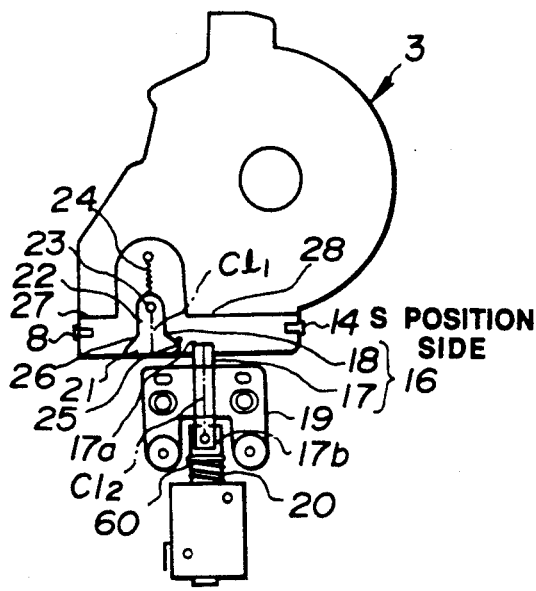
Figure 11:
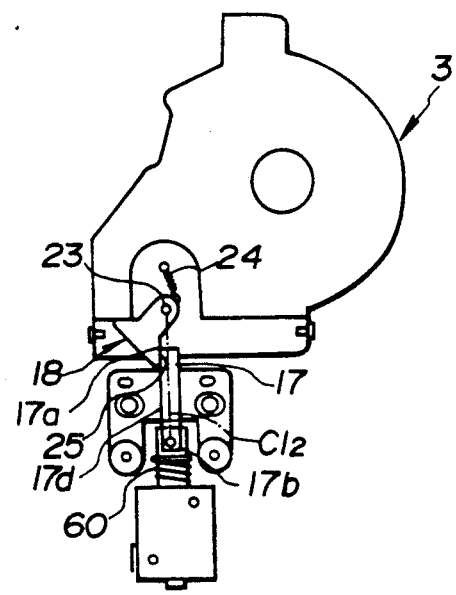

As shown in FIGS. 10 and 11, as the movement table 3 is moved from the L position side to the intermediate cassette mount position, the first angled surface 25 of the stopper catch 18 is engaged by one side portion 17d of the intermediate stopper 17. Because of this abutting engagement, the stopper catch 18 is rocked in a clockwise direction as viewed in FIGS. 11 and 14. When the pivot axis of the shaft 2 of the stopper catch 18 is aligned with the extended position of the center line $cl_2$ of the intermediate stopper 17 (see FIG. 11), the second angled surface 26 of the head of the stopper catch 18 abuts against a horizontally extending abutment surface 27 integrally formed with the movement table 3 or 4. As a result thereof, further clockwise rotation of the stopper catch 18 is prevented. Therefore, as set forth above, the movement table 3 or 4, when moved from the L position side, can be precisely retained in the intermediate cassette mount position.

Figure 13:
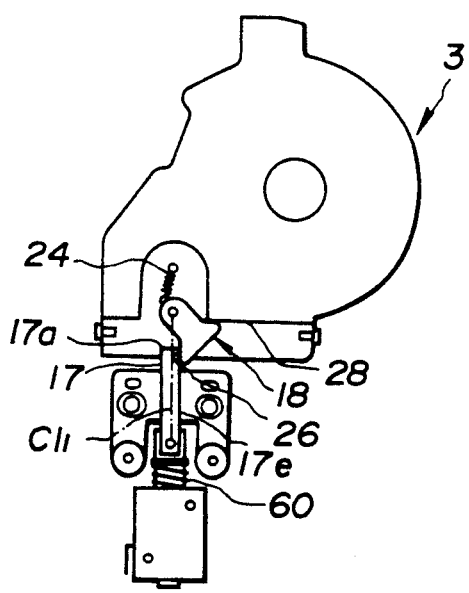
Figure 12:
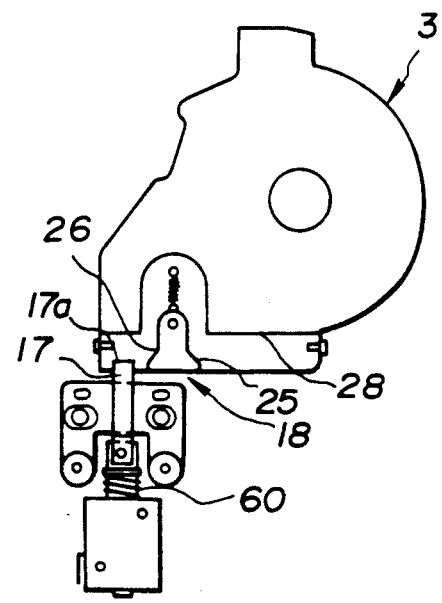

As shown in FIGS. 12 and 13, when the movement table 3 or 4 is moved from the S position side to the intermediate cassette mount position, the second angled surface 26 of the stopper catch 18 engages the other side portion 17e of the intermediate stopper 17. This abutting engagement causes the stopper catch 18 to rock in a counterclockwise direction as is illustrated in FIG. 13. When the pivot axis of the shaft 23 of the stopper catch 18 is aligned with the extended position of the longitudinal center line $cl_2$ of the intermediate stopper 17, the first angled surface 25 of the stopper catch 18 abuts against the horizontal abutment surface 28 integrally formed with the movement table 3 or 4. Thus, further counterclockwise rotation of the stopper catch 18 is prevented. Therefore, the movement table 3 or 4, when moved from the S position side, can be precisely retained at the intermediate cassette mount position.

Although the operation of the movement table positioning mechanism for movement table 3 is illustrated in FIGS. 10-13, it will be apparent that the movement table positioning mechanism for movement table 4 operates in a corresponding manner.

In accordance with an aspect of this invention and as illustrated in FIG. 14, the intermediate stopper mechanism 16, including the stopper 17 and the pivotable stopper catch 18, is operative to arrest movement of the movement tables, and additionally, the reel tables supported thereon, in a precise predetermined intermediate mount position independent of the direction of movement of the movement tables toward the intermediate mount position.

Figure 9:
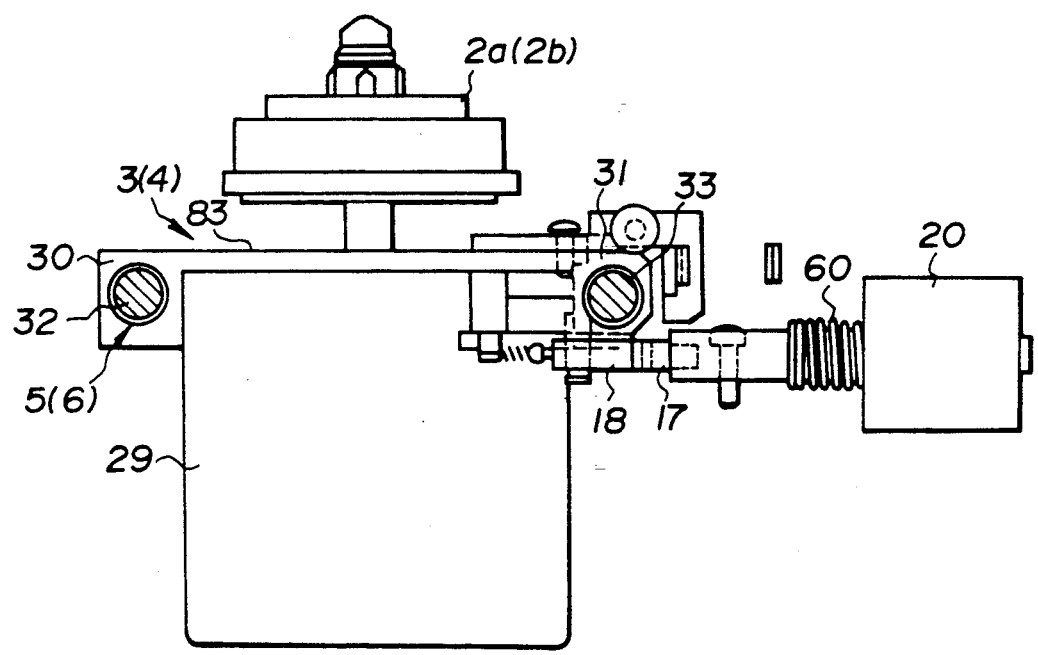
FIG. 9 is an enlarged side elevational view, partly in section along the line IX—IX on FIG. 8, of a reel table, movement table and guide member assembly employed in the reel table shifting device of FIG. 8.

The structures of the reel tables 2a and 2b, movement tables 3 and 4, and guide members 5 and 6 are further specifically illustrated in FIG. 9. As shown in FIG. 9, the reel table, such as 2a, extends from the upper portion 83 of the respective movement table 3 or 4. In order to rotatably drive the reel table, a reel drive motor 29 is provided within the lower portion of the movement table 3. A pair of guide bearing portions 30 and 31 are integrally formed along the side portions of the movement table 3 or 4. Each of the guide members 5 or 6, is constituted by a pair of guide shafts 32 and 33 which are engaged by the guide bearing portions 30 and 31 (FIG. 9) such that the movement table 3 or 4 can be slidably moved along the guide shafts 32 and 33 in its predetermined path of travel defined thereby. As aforementioned, when the movement tables 3 and 4 are moved toward the large-sized cassette mount positions $P_1$, they extend away from each other, and when the movement tables 3 and 4 are moved toward the small-sized cassette mount positions $P_2$, the movement tables approach each other.

Figure 8:
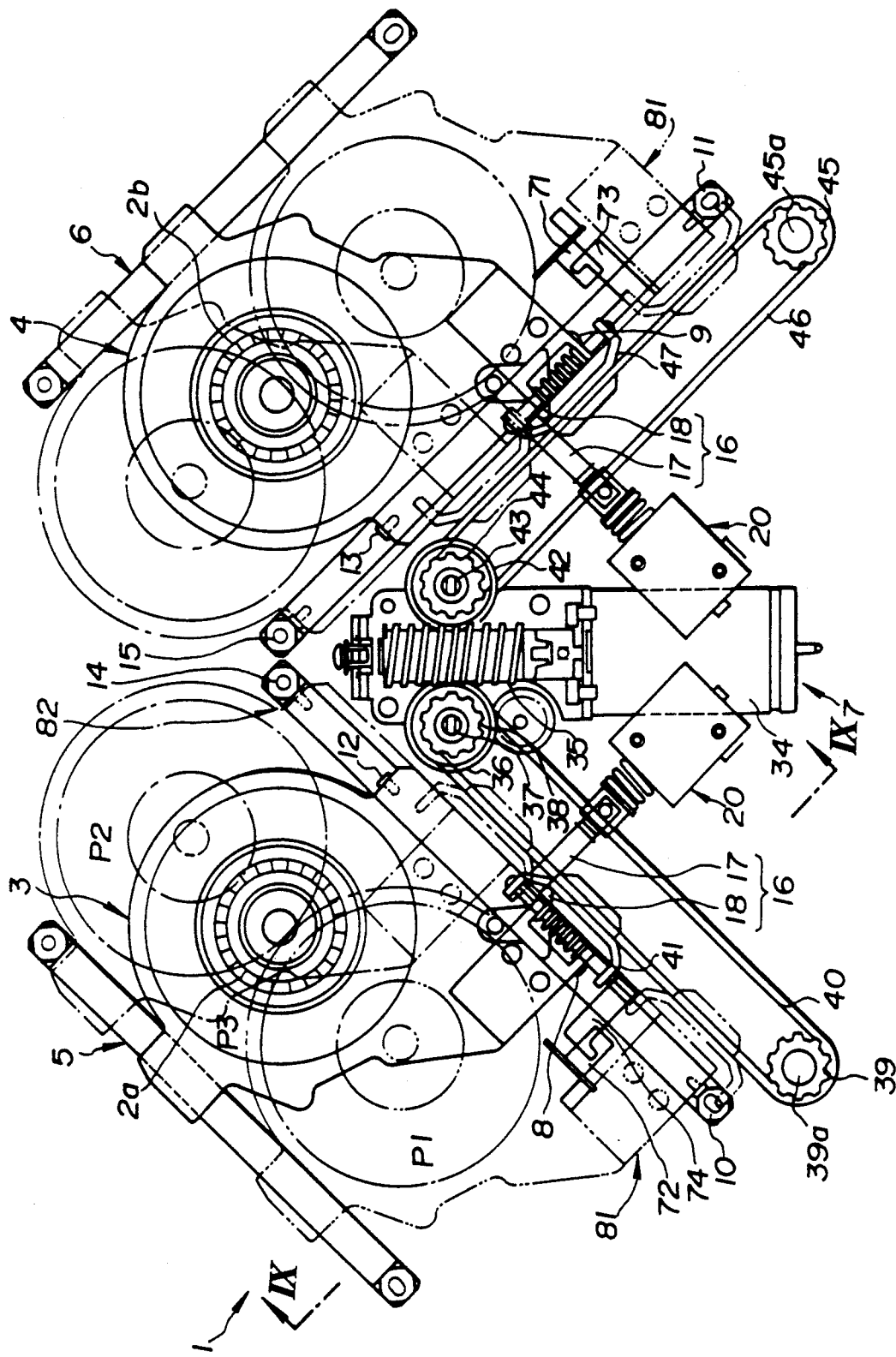
FIG. 8 is a top plan view showing a reel table shifting device according to an embodiment of the present invention.
Figure 23:
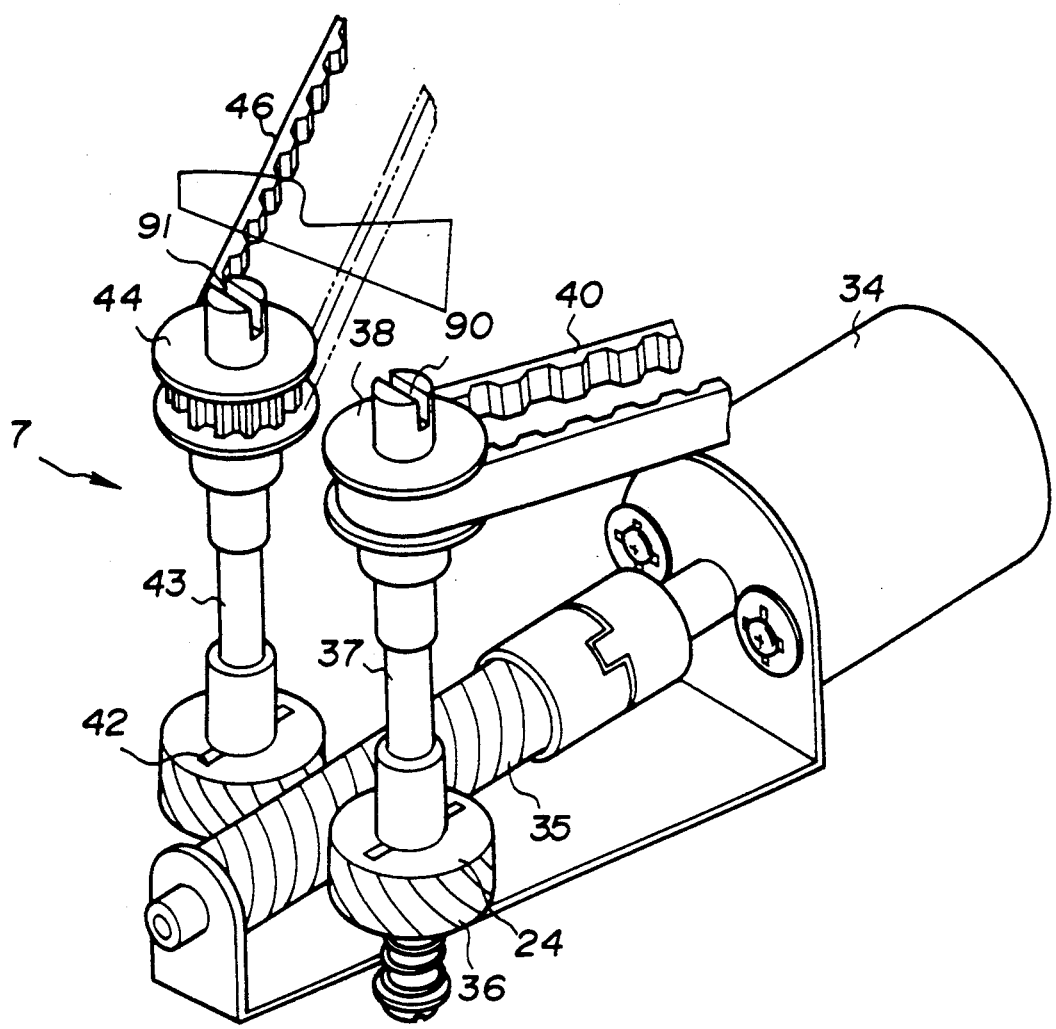
FIG. 23 is an enlarged, fragmentary perspective view of a portion of a drive mechanism employed in the reel table shifting device of FIG. 8, and specifically illustrating an alignment mechanism for ensuring synchronous movement of the movement tables.
Figure 24:
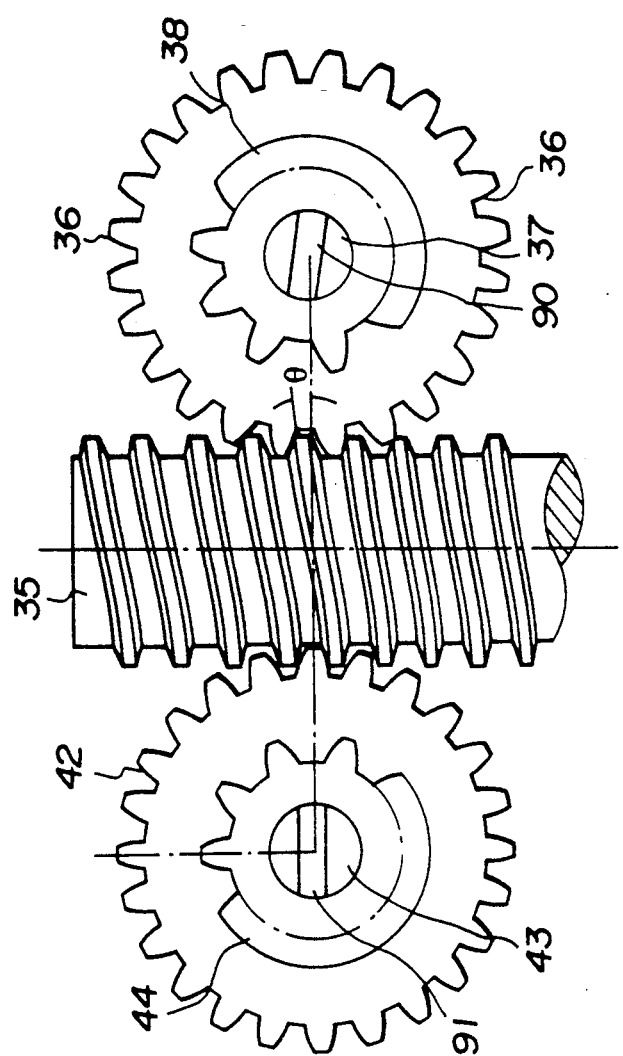
FIG. 24 is a partial top plan view of the drive mechanism of FIG. 23 for further illustrating the alignment mechanism.

A preferred arrangement of the movement table driving mechanism 7 in the reel table shifting device embodying this invention is illustrated in FIGS. 8, 23 and 24. This movement table driving mechanism permits the pair of movement tables 3 and 4 to be moved synchronously in opposed directions to each other between the first cassette mount positions $P_1$, wherein a large-sized cassette can be supported on the reel tables, the second cassette mount positions $P_2$, wherein a relatively small-sized cassette can be supported on the reel tables, and an intermediate cassette mount positions $P_3$ disposed between cassette mount positions $P_1$ and $P_2$, and wherein an intermediate-sized cassette can be supported on the reel tables.

As shown in FIGS. 8, 23 and 24, the movement table driving mechanism 7 includes a worm gear 35 rotatably mounted to be driven by a drive motor 34. A pair of worm wheels 36 and 42 are provided at opposite sides of the worm gear 35 and are in meshing engagement therewith so that, when the worm gear is rotated, the worm wheels rotate synchronously in opposed directions to each other. A rotary shaft 37 extends from the worm wheel 36 and rotatably supports a drive timing pulley 38 thereon. As hereinafter described, a side portion of the movement table 3 is operatively connected to a first timing belt 40 which runs around the drive timing pulley 38 and around another timing pulley 39 rotatable on an idler shaft 39a (FIG. 8). A rotary shaft 43 extends from the other worm wheel 42 and rotatably supports a drive timing pulley 44. A side portion of the movement table 4 is operatively connected to a second timing belt 46 which runs around the drive timing pulley 44 and around another timing pulley 45 rotatable on an idler shaft 45a. The movement tables 3 and 4 are operatively connected to the first and second timing belts 40 and 46, respectively, through first and second belt connecting mechanisms 41 and 47, respectively. The shafts 37 and 39a are parallel and arranged relative to each other so that the runs of timing belt 40 between pulleys 38 and 9 are parallel to the path of movement of the table 3 on guide structure 5. The shafts 43 and 45a are similarly arranged in respect to the path of movement of the table 4.

When the worm gear 35 is rotated by the drive motor 34 in a first direction, the worm wheels 36 and 42 are synchronously rotated in counter-clockwise and clockwise directions, respectively, as viewed on FIG. 8, for driving the first and second timing belts 40 and 46 in synchronous opposed directions to each other. Accordingly, the movement tables 3 and 4 operatively connected to the first and second timing belts 40 and 6 through the belt connecting mechanisms 41 and 47, respectively, can be synchronously moved along their predetermined paths of travel away from each other. When the worm 35 is rotated in a second direction opposite to the first direction, the movement tables 3 and 4 can be synchronously moved in directions approaching each other.

Figure 15:
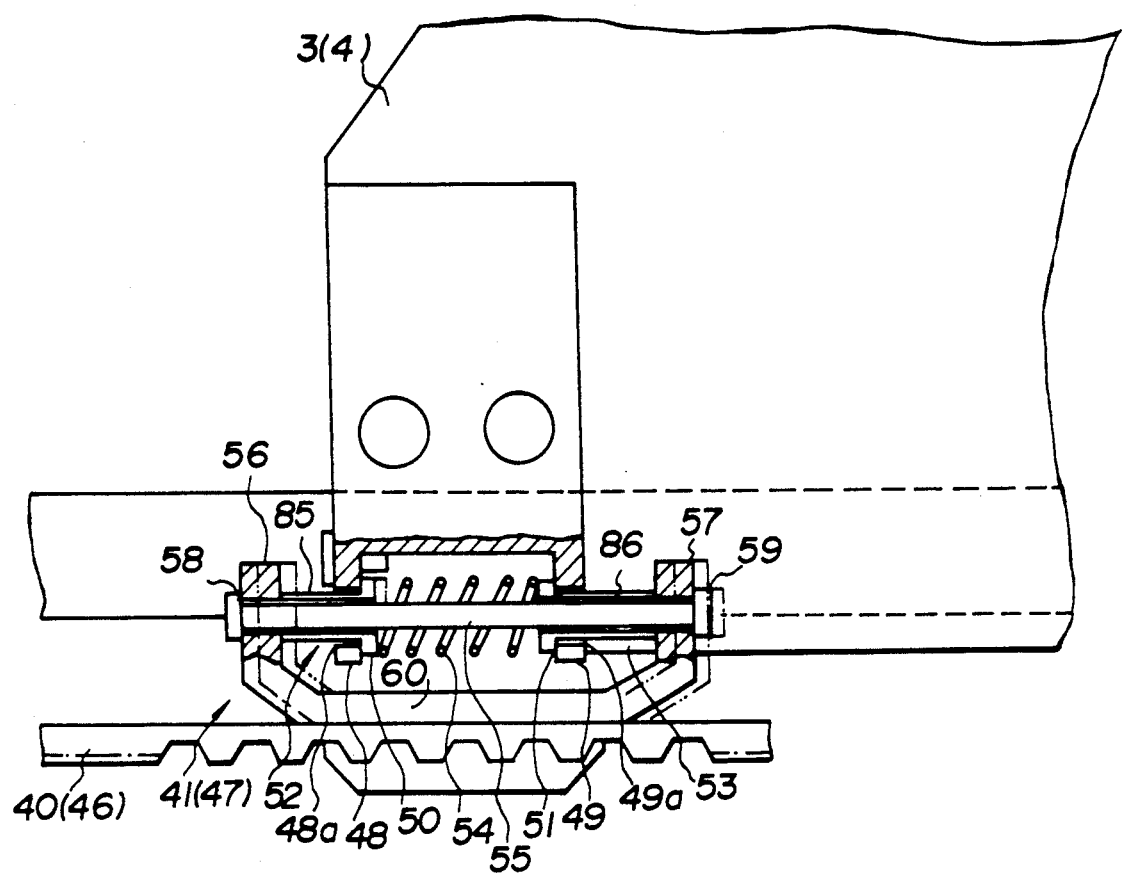
FIG. 15 is an enlarged plan view, partly in section, of a belt connecting mechanism employed in the reel table shifting device of FIG. 8.

As will be described in further detail below, the belt connecting mechanisms 41 and 47, in addition to connecting the first and second timing belts 40 and 46 to the movement tables 3 and 4, respectively, bias the positioned movement tables 3 and 4 so that a biasing force is applied to the angled surfaces of the stopper catch 18 when the movement tables are moved from either the L or S positions to the intermediate cassette mount positions. As shown in FIG. 15, each of the belt connecting mechanisms 41 and 47 is slidably inserted in a pair of bearing members 48 and 49 which are formed in the movement table 3 or 4. Each of the belt connecting members 41 and 47 also includes a pair of cylindrical collar members 52 and 53 slidably inserted in the bearing members 48 and 49 and having flanges 50 and 51, respectively, at their inner ends. The flanges 50 and 51 contact the inner surfaces of the bearing members 48 and 49. A shaft 55 expands through the cylindrical collar members 52 and 53 and a limiter coil spring 54 which bears at its opposite ends, against the flanges 50 and 51.

The ends of the shaft 55 extend outwardly from the cylindrical collars 52 and 53 when the flanges 50 and 52 engage the bearing pieces 48 and 49. The ends of shaft 55 extends through apertured end portions 56 and 57 of a yoke 60 which is secured, at is middle portion, to the adjacent belt 40 or 46. Heads 58 and 59 are provided on the ends of the shaft 55 and bear against the outer surfaces of the end portions 56 and 57.

When the stopper catch 18 mounted on the movement table 3 or 4 contacts the respective intermediate stopper 17, and, thereafter, the respective timing belt 40 or 46 is further moved, the limiter coil spring 54 is compressed through the end portion 56 or 57 of the yoke 60 acting against the collar 52 or 53, and through the flange 50 or 51, on the spring 54. Accordingly, each 10 pivotable stopper catch 18 is urged against the respective stopper 17 by the biasing reaction force of the limiter spring 54 when the movement tables 3 and 4 are moved either from the L or S position sides to their intermediate cassette mount positions.

The operation of the belt connecting mechanisms 41 and 47 will be further described in detail below. When, for example, the movement tables 3 and 4 are positioned at the L position side and a medium-sized tape cassette is inserted into a tape cassette loading holder, the size of the cassette is suitably detected by a sensor. Then, the movement tables 3 and 4 are moved to the intermediate cassette mount position by means of the movement table driving mechanism 7 so that the first angled surface 25 of each stopper catch 18 is abuttingly engaged by the side surface 17d of the respective intermediate stopper 17. Each stopper catch 18 rotates clockwise about its center shaft 23 until the center shaft 23 is aligned with the extended position of the center line $cl_2$ of the respective intermediate stopper 17 (FIG. 11), whereupon, the rotation of the stopper catch 18 is arrested due to the second angled surface 26 being restrained from further movement by the horizontal abutment surface 27. Thus, the movement tables 3 and 4 are reliably retained at their respective intermediate cassette mount positions.

If the drive motor 34 of the movement table driving mechanism 7 is further rotated to additionally move the first and second timing belts 40 and 46, the limiter spring 54 of each of the belt connecting mechanisms 41 and 47 is compressed. Due to the compression of each limiter spring 54, the first angled surface 25 of each stopper catch 18 is strongly urged against the side surface 17d of the respective intermediate stopper 17 by the biasing force generated by the compressed spring 54 so that each movement table is securely retained in its intermediate cassette mount position.

When the movement tables 3 and 4 are moved from the S position side to their intermediate cassette mount positions, the second angled surface 26 of each stopper catch 18 is abuttingly engaged by the side surface 17e of the respective intermediate stopper 17. Each of the movement tables 3 and 4 will then be securely retained in its intermediate cassette mount position in response to the compression of the respective spring 54 in the manner described in detail above.

It is to be noted that in the examples illustrated in the drawings the stopper catch 18 is mounted for rocking about its shaft 23. However, the stopper catch 18 can also be slidably moved. 5 Further, in the illustrated examples, each stopper catch 18 is moved with the respective movement table 3 or 4, while the stopper 17 is at a stationary location. However, the intermediate stoppers 17 can be mounted to the movement tables 3 and 4 and the stopper catches 18 can be mounted on the chassis.

Figure 16:
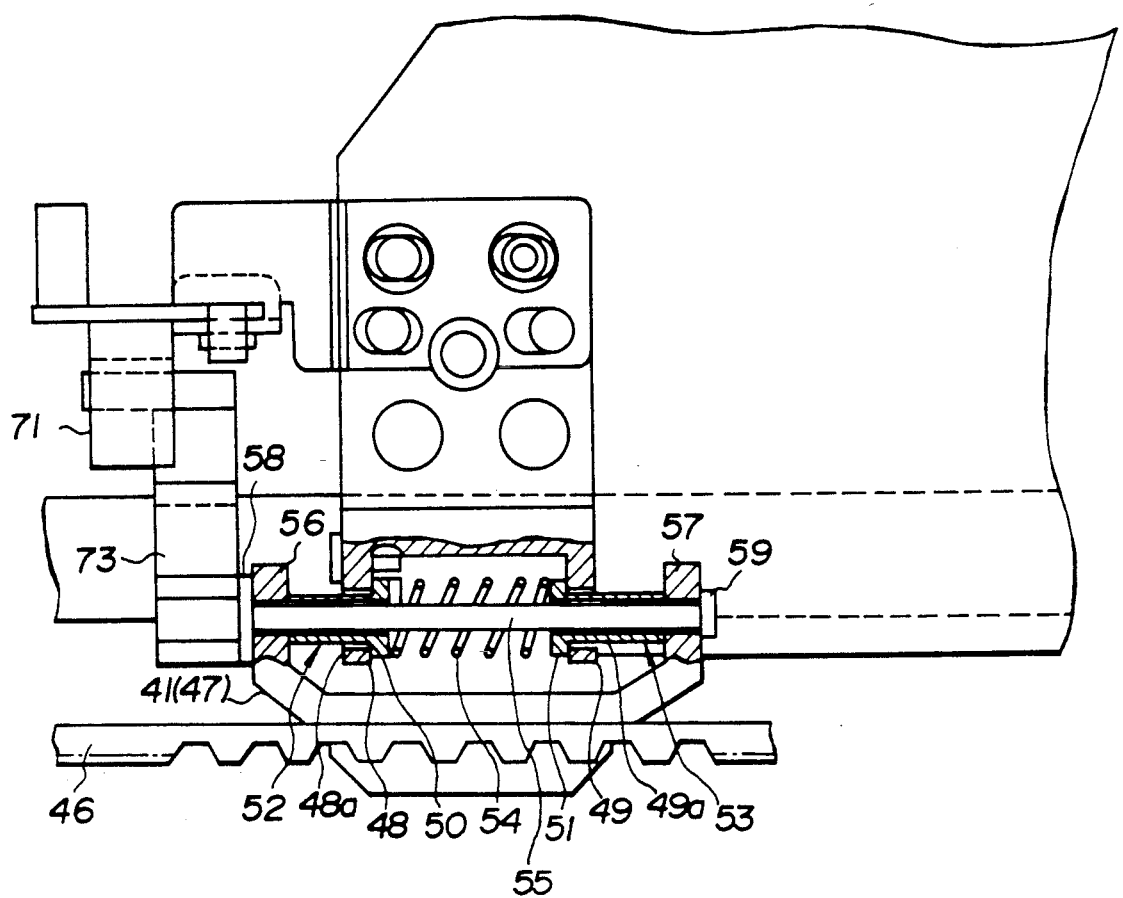
FIG. 16 is a view similar to that of FIG. 15, but showing another embodiment of a belt connecting mechanism employed in the reel table shifting device of FIG. 8, and further illustrating a sensor assembly used to detect the direction of movement of the movement tables.

In accordance with another aspect of the present invention, the reel table shifting device includes a sensing device for detecting whether the movement tables have been moved from either the L or S positions to the intermediate cassette mount positions when the limiter springs 54 are compressed. As is shown in FIGS. 8 and 16, a first sensor 71 is mounted on the movement table 4 and a second sensor 72 is mounted on the movement table 3. The sensors 71 and 72 are photo-sensors or the like. The first sensor 71 is turned on or off by a first shutter 73, for example, when the latter selectively interrupts a light beam in the sensor, and the second sensor 72 is similarly turned on or off by a second shutter 74.

The first shutter 73, is shown in FIG. 16 to be mounted on one end of the shaft 55 of the belt connecting mechanism 47. The first shutter 73 moves in unison with the shaft 55 of the belt connecting mechanism 47 relative to the respective movement table 4 and is adapted to turn on or close the first sensor 71 when the movement tables 3 and 4 move from the L position side and are retained in their intermediate cassette mount positions with the limiter spring 54 being compressed, as described above. The second shutter 74 is mounted on an end of the shaft 55 of the belt connecting mechanism 41. The second shutter 74 moves in unison with the shaft 55 of the belt connecting mechanism 41 and is adapted to turn on or close the respective sensor 72 when the movement tables 3 and 4 are moved from the S position side and are retained in their intermediate cassette mount positions with the respective limiter springs 54 being compressed.

Although, in the embodiment illustrated in FIGS. 8 and 16, the sensors 71 and 72 are mounted on the movement tables 3 and 4 and the shutters 73 and 74 are mounted on the shafts 55 of the connecting mechanisms 47 and 41, the sensors 71 and 72 can be mounted o the shafts 55 of the belt connecting mechanisms 41 and 47 and the shutters 73 and 74 can be mounted on the movement tables 3 and 4.

Operation of the sensors 71 and 72 will now be explained with reference to FIGS. 17-22 in which, for ease in illustration, both sensors 71 and 72 are shown mounted on one of the movement tables 3 and 4 and both shutters 73 and 74 are shown mounted on the same one of the belt connecting mechanisms 41 and 47.

Figure 17:
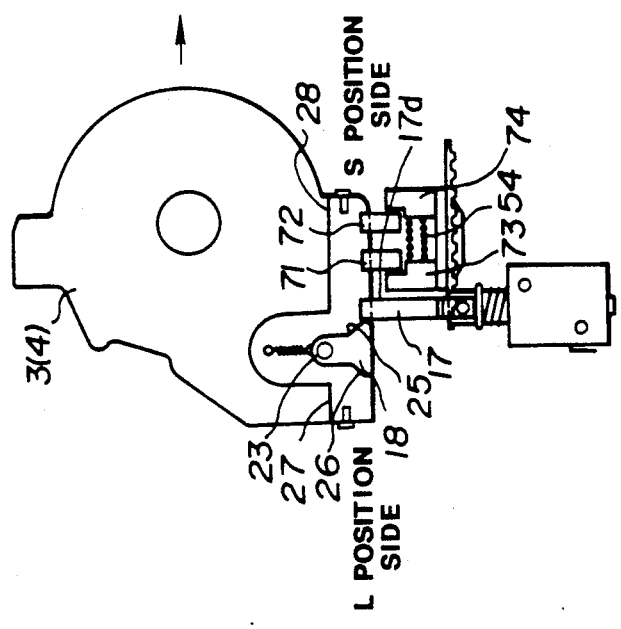

As shown in FIG. 17, when each of the movement tables 3 and 4 moves from left to right on the drawing, that is, from the L position side to the intermediate cassette mount position, the first angled surface 25 of the stopper catch 18 is abuttingly engaged by the side surface 17d of the intermediate stopper 17. The stopper catch 18 is then rotated clockwise about its pivot shaft 23 until it is restrained from further pivotable rotation by the abutment surface 27 so that each of the movement tables is then positioned in the intermediate cassette mount position (FIG.

Figure 19:
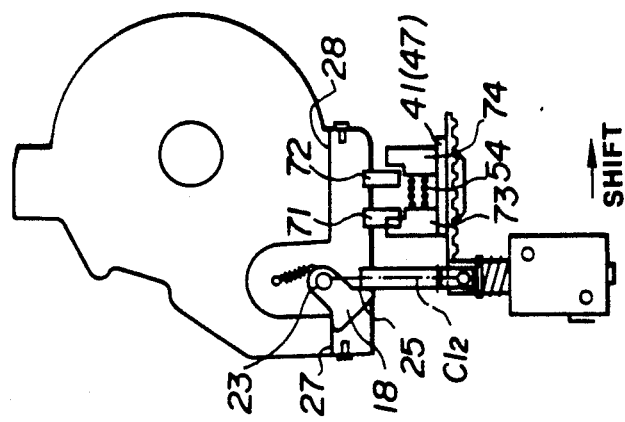
FIGS. 17-22 are explanatory views showings the operation of a direction sensor assembly, such as that illustrated in FIG. 16, employed in the reel table shifting device of FIG. 8.
Figure 18:
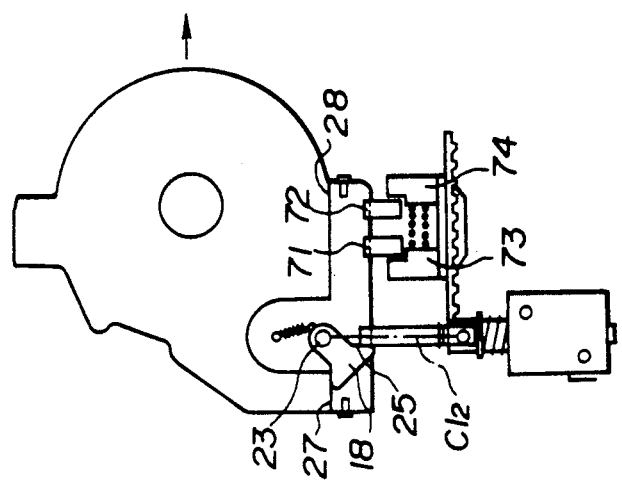

As the shift motor 34 is further operated and the first and second timing belts 40 and 46 are moved from left to right as viewed on FIG. 19, the limiter springs 54 of the belt connecting mechanisms 41 and 47 are compressed. Due to this biasing force, the first angled surface 25 of each stopper catch 18 is strongly urged against the side surface 17d of the respective intermediate stopper 17 such that each of the movement tables 3 and 4 is fixedly secured in the intermediate cassette mount position. Simultaneously with such compression of the springs 54, the shafts 55 are displaced relative to the movement tables 3, 4 so that the shutter 73 mounted on the shaft 55 of the belt connecting mechanism 47 interrupts the sensor 71 mounted on movement table 4 (FIG. 19).

Figure 22:
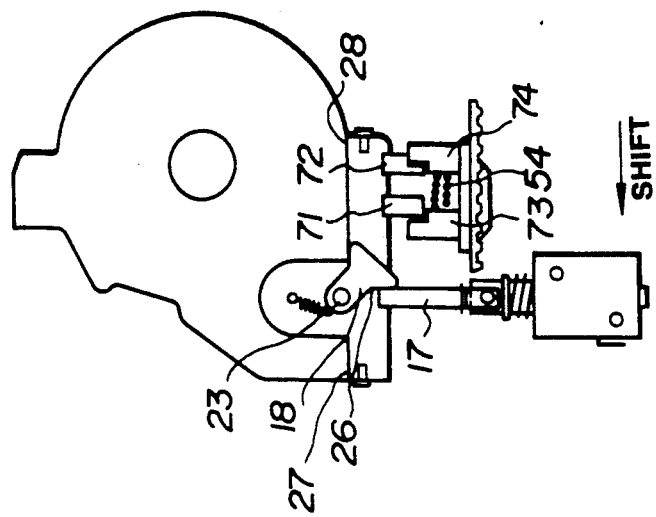
Figure 21:
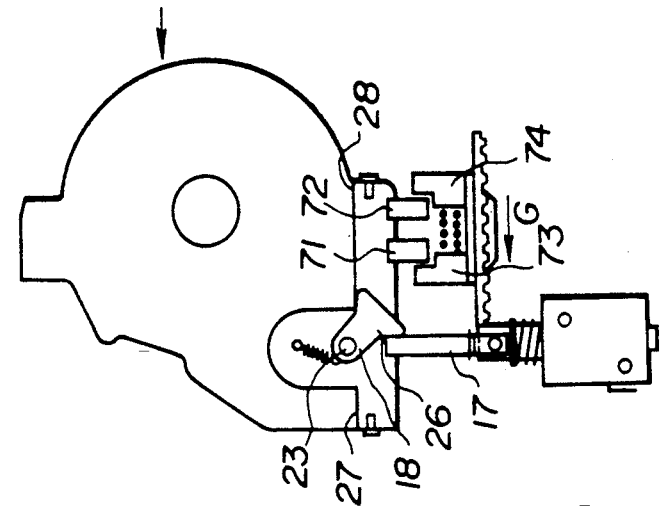
Figure 20:
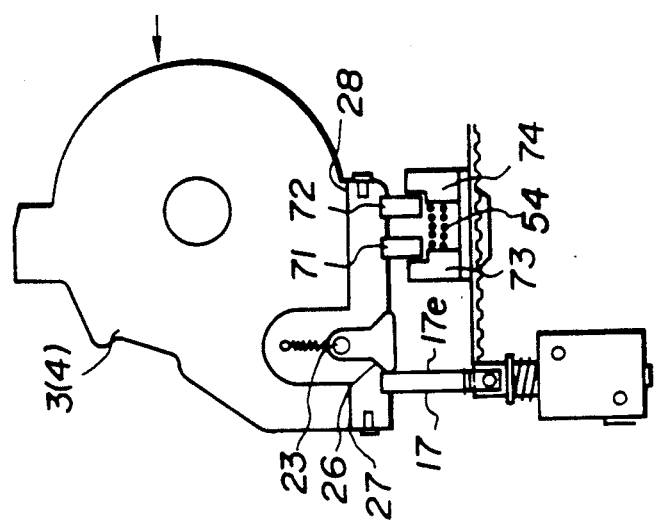

Also, as is illustrated in FIG. 20, when each of the movement tables 3 and 4 moves from the S position side to the intermediate cassette mount position, that is, from right to left as viewed on the drawings, the second angled surface 26 of the stopper catch 18 is abuttingly engaged by the other side surface 17e of the intermediate stopper 17. The stopper catch 18 is turned counterclockwise about its shaft 23 until it is restrained from further pivotable rotation by the abutment surface 28 so that the movement tables 3 and 4 are positioned in their intermediate cassette mount positions (FIG. 21). Thereafter, further operation of shift motor 34 and corresponding movements of the timing belts 40 and 46 causes the limiter springs 54 of the belt connecting mechanisms 41 and 47 to be compressed with corresponding movements of the shafts 55. Due to the biasing force of the compressed springs 54, the second angled surface 26 of each stopper catch 18 is strongly urged against the other side surface 17 of the intermediate stopper 17 so that the respective one of the movement tables 3 and 4 is fixedly secured and positioned in its intermediate cassette mount position. As a result of the movement of each shaft 55 that accompanies the compression of the respective spring 54, the second shutter 74 mounted on the shaft 55 of the first connecting member 41 closes or interrupts the adjacent sensor 72 mounted on the movement table 3 (FIG. 22).

In accordance with another aspect of this invention, an alignment mechanism is provided to ensure synchronous movement of the movement tables 3 and 4. As was described above with reference to FIGS. 23 and 24, the rotary worm wheels 36 and 42 meshing with opposite sides of the worm gear 35 are frictionally or otherwise adjustably coupled to the shafts 37 and 43 which extend upwardly from the worm wheels 36 and 42, respectively, and have drive timing pulleys 38 and 4 rotatably fixed to the shafts. The drive timing pulleys 38 and 44 engage the first and second timing belts 40 and 46, respectively, which are operatively connected to the movement tables 3 and 4 for moving the latter in their predetermined paths of travel.

As shown in Fig. 23, diametrical slots or slits 90 and 91 are provided in the upper ends of the rotary shafts 37 and 43, respectively. The slots 90 and 91 are engageable by a suitable tool, such as, a flat steel plate, and thereby provide means for independently adjusting the rotational positions of the first and second shafts 37 and 43 and the first and second drive pulleys 38 and 44 secured thereto relative to the respective worm gears 36 and 42 to ensure synchronous movement of the movement tables 3 and 4. Specifically, by independently adjusting these two slots 90 and 91 so that they are laterally aligned, the positional relationship of the teeth of the worm wheels 36 and 42 relative to the worm 35 can be compensated for ensuring that the timing belts 40 and 46 will be in synchronous relation for moving the movement tables 3 and 4 in accordance therewith.

In accordance with still another aspect of this invention, a servo motor control circuit 200 (FIG. 25) is provided which ensures that, when the movement tables 3 and 4 are moved to, and retained at their intermediate cassette mount positions, each pivotable stopper catch 1B is positively urged against the corresponding side surface of the respective stopper 17 with a uniform pressing force. In this servo motor control circuit 200, one or the other of the first and second sensors 71 and 72 is effective to detect the deflection or compression of the limiter springs 54 at the conclusion of the movement of the movement tables 3 and 4 from the L or S positions to the intermediate cassette mount positions. The outputs of the sensors 71, 72 included in a position detector circuit are connected to a system controller 201 which, in response thereto, operates a switching device 202 for selecting either a constant speed or a constant torque mode of operation of the motor 34 in the reel table shifting device. More specifically, when sensors 71, 72 detect that the respective movement tables 3, 4 are remote from their respective intermediate cassette mount positions, the resulting signals from the position detector circuit cause the controller 201 to dispose the switching device 202 in the position shown on FIG. 25 for selecting the constant speed mode. In the constant speed mode, the output of the position detecting circuit is applied to a differentiator 203 which outputs a speed indicating signal $S_s$ to one input of a comparator 204 having another input receiving a reference speed signal $S_R$. The comparison output of comparator 204 is applied through the switching circuit 202 to a drive amplifier 205 for the motor 34.

Figure 25:
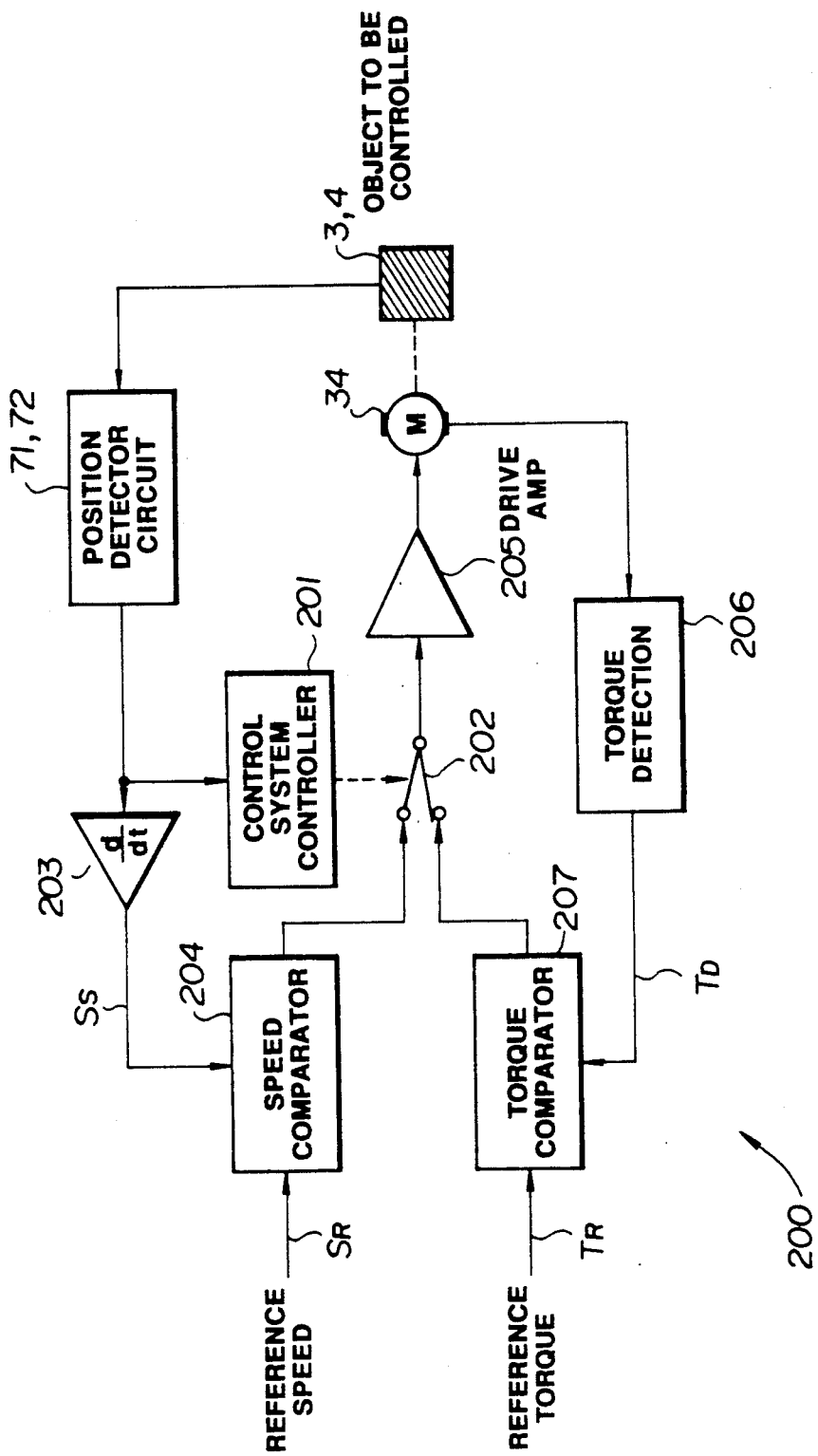
FIG. 25 is a block diagram of a servo motor control circuit employed in the reel table shifting device of FIG. 8.

If either of the sensors 71, 72 indicates that the respective movement tables 3, 4 have been moved to their intermediate cassette mount positions and that the respective springs 54 have been compressed to a predetermined extent, the output from the respective sensor 71 or 72 causes the controller 201 to change-over the switching device 202 to the condition shown in broken lines on FIG. 25, for selecting the constant torque mode of operation of the motor 34. In such constant torque mode of operation, a torque detector 206 detects the actual torque generated by the motor 34 and applies a corresponding detected torque signal $T_D$ to one input of a torque comparator 207. A reference torque signal $T_R$ representing the constant torque to be maintained is applied to another input of the comparator 207, and the comparison output of torque comparator 207 is supplied through switching device 202 to the drive amplifier 205 for the motor 34.

Figure 26:
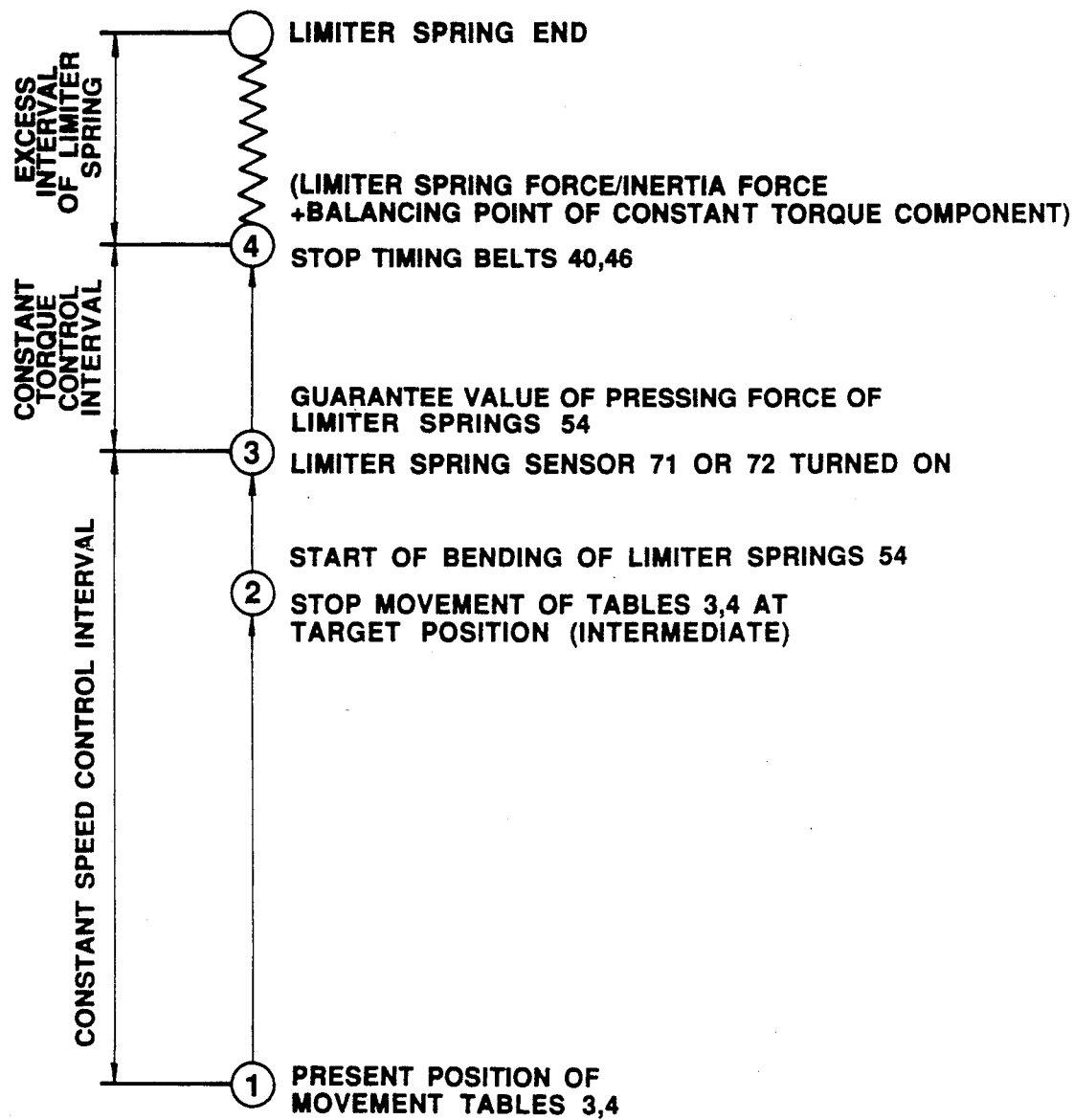
FIG. 26 is a diagram illustrating the operation of the servo motor control circuit of FIG. 25.

A cycle of operation of the servo motor control circuit 200 will now be described with reference to FIG. 26 which schematically indicates, at step (1), the initiation of the operation of the motor 34 in its constant speed mode for moving the tables 3, 4 from either the L or S positions toward the intermediate cassette mount positions. When the movement tables 3 and 4 are moved to positions at which the angled surfaces 25 and 26 of each stopper catch 18 are applied to the respective intermediate stopper 17 and to the surface 27 or 28 of the respective table 3, 4, as at step (2), the movement of the tables 3, 4 is stopped at the target or intermediate cassette mount positions and bending or compression of the limiter springs 54 is commenced as operation of the motor 34 and movement of the timing belts 40 and 46 continues. During such compression of the springs 54, the shafts 55 with the shutters 73 and 74 thereon move relative to the sensors 71 and 72 on the tables 3 and 4 until one or the other of the sensors 71 and 72 is turned on or interrupted by the respective shutter, as at step (3). At such time, operation of the motor 34 is changed-over from the constant speed mode to the constant torque mode and movement of the timing belts 40, 46 continues until the resultant increased force of the springs 54 is balanced by inertia and the constant torque applied by the motor as at step (4).

It will be appreciated that, at step (4), that is, at the point when the springs 54 have been compressed sufficiently to provide spring forces balancing the constant torque generated by the motor 34, the elastic limit of the springs 54 has not yet been attained. In other words, the springs 54 can be further compressed from the condition at step (4) to the condition indicated at (5) on FIG. 26 without causing permanent deformation of the springs. Therefore, the operating cycle illustrated on FIG. 26 can be repeated with assurance that, in each cycle, the springs 54 will exert a predetermined force for maintaining the tables 3 and 4 at their intermediate cassette mount positions upon attaining step (4) of the operating cycle.

After the limiter springs 54 have been compressed or deflected a predetermined amount, the power supply of the drive motor 34 may be turned off with the loading of the springs 54 being maintained by utilizing a so-called self-lock or irreversible effect of the worm 35 meshing with the worm wheels 36 and 42. However, in such case, when the power supply is turned off, instantaneous biting of the worm gear 35 and the worm wheels 36 and 40 occurs. In order to avoid such situation, the servo motor control system may be adapted to apply a relatively small voltage continuously to the drive motor to generate a suitable constant torque. This prevents the biting or the like of the worm gear 35 and the worm wheels 36 and 42 by transforming the transmission from a kinetic friction state to a static friction state with the biasing forces of the limiter springs 54 being balanced.

By way of summary, the servo motor control circuit 200 moves the movement tables 3 and 4 at a constant speed when they are moved from one to another of the positions $P_1$, $P_2$ and $P_3$. However, when the limiter springs 54 have been deflected by a predetermined amount, one of the first and second sensors 71, 72 detects this deflection and the drive motor 34 is switched to a constant torque mode so that the springs 54 are thereby kept in the compressed state.

Although preferred embodiments of the invention have been described in detail herein with reference to the accompanying drawings, it is to be understood that the present invention is not limited to those precise embodiments, and that many changes and modifications may be effected therein by one skilled in the art without departing from the spirit and scope of the invention as defined in the appended claims.

What is claimed is:

1. A reel table shifting device adapted to receive a tape cassette which is in a range of different sizes, said reel table shifting device comprising:
    guide means;
    reel table means for supporting said cassette;
    means mounting said reel table means for movement along said guide means;
    driving means for moving said reel table means along said guide means in a predetermined path between first and second mount positions such that said cassette can be mounted at respective one of said mount positions depending upon the size of said cassette; and
    means for physically blocking movement of said reel table means in a predetermined intermediate mount position which is between said first and second mount positions and which is the same irrespective of the direction of movement of said reel table means from said first or second mount position toward said intermediate mount position.

2. A reel table shifting device adapted to receive a tape cassette which is in a range of different sizes, said reel table shifting device comprising:
    reel table means for supporting said cassette;
    driving means for moving said reel table means between a plurality of mount positions such that said cassette can be mounted at one of said mount positions depending upon the size of said cassette; and
    means for arresting movement of said reel table means in a predetermined intermediate mount position which is the same irrespective of the direction of movement of said reel table means toward said intermediate mount position, said means for arresting movement of said reel table means including
    a stopper having a longitudinal central axis, and
    a stopper catch pivotable about a pivot axis and having first and second angled surfaces along opposed side edges thereof, one of said angled surfaces being capable of abutting engagement with said stopper in said intermediate mount position in dependence on said direction of movement of said reel table means toward said intermediate mount position.

3. The reel table shifting device as in claim 2; and further including an abutment surface integrally formed with said reel table means and capable of abutting engagement with the other of said angled surfaces in said intermediate mount position to thereby restrict further pivotable movement of said stopper catch and retain said reel table means in said intermediate mount position.

4. The reel table shifting device as in claim 2; wherein said first and second angled surfaces of said stopper catch are capable of abutting engagement with first and second side surfaces, respectively, of said stopper.

5. The reel table shifting device as in claim 2; wherein said stopper catch is movable with said reel table means.

6. The reel table shifting device as in claim 2; wherein said stopper is movable with said reel table means.

7. The reel table shifting device as in claim 2; wherein said one of said first and second angled surfaces of said stopper catch is capable of abutting engagement with said stopper when said pivot axis of the stopper catch is aligned with said longitudinal central axis of said stopper.

8. The reel table shifting device as in claim 2; wherein said stopper is solenoid-actuated for reciprocal movement of said stopper into and out of a path of movement of said stopper catch.

9. A reel table shifting device adapted to receive a tape cassette which is of relatively large, intermediate or small size, said reel table shifting device comprising:
    reel table means for supporting said cassette of relatively large, intermediate, or small size;
    movable support means for mounting said reel table means;
    driving means for moving said movable support means between a plurality of cassette mount positions including a first mount position, wherein a large-sized cassette can be supported on said reel table means, a second mount position, wherein a small-sized cassette can be supported on said reel table means, and a third mount position between said first and second mount positions, and wherein an intermediate-sized cassette can be supported on said reel table means; and intermediate stopper means operative to arrest movement of said movable support means in said third mount position from either of said first or second mount positions, said intermediate stopper means including a stopper having a longitudinal central axis, and a stopper catch pivotable about a pivot axis and having first and second angled surfaces along the opposite side edges thereof, one of said stopper and said stopper catch being movable with said movable support means and the other thereof being positioned to engage said one of said stopper and said stopper catch when said movable support means moves to said third mount position such that one of said angled surfaces is capable of abutting engagement with said stopper to retain said movable support means in said third mount position in dependence on whether said movable support means approaches said third mount position from said first mount position or said second mount position.

10. The reel table shifting device as in claim 9; wherein said movable support means includes an abutment surface of generally horizontal orientation engageable by the other of said angled surfaces.

11. The reel table shifting device as in claim 10; wherein, when said movable support means is moved from said first mount position to said third mount position, said first angled surface of said stopper catch abuts against a first side surface of said stopper to pivot said stopper catch in one direction so that said second angled surface of said stopper catch thereby abuts against said abutment surface of said movement table means to restrict further pivoting in said one direction by said stopper catch and to retain said movable support means in said third mount position.

12. The reel table shifting device as in claim 10; wherein, when said movable support means is moved from said second mount position to said third mount position, said second angled surface of said stopper catch abuts against a second side surface of said stopper to pivot said stopper catch in the other direction so that said first angled surface of said stopper catch thereby abuts against said abutment surface of said movable support means to restrict further pivoting in said other direction by said stopper catch and to retain said movable support means in said third mount position.

13. The reel table shifting device as in claim 9; wherein said pivot axis about which said stopper catch is pivotally mounted is fixed on said movable support means so that said stopper catch is movable with said movable support means.

14. The reel table shifting device as in claim 13; wherein said stopper abuts against one of said first and second angled surfaces of said stopper catch when the pivot axis of said stopper catch is aligned with said longitudinal central axis of said stopper.

15. The reel table device as in claim 9; wherein said stopper is movable with said movable support means.

16. The reel table shifting devices as in claim 9; wherein said stopper is solenoid-actuated for reciprocal movement of said stopper into and out of a path of movement of said movable support means.

17. The reel table shifting device as in claim 9; and further including first and second pairs of opposed guide members each defining a predetermined path of travel for said movable support means between said first, second and third mount positions.

18. The reel table shifting device as in claim 17; wherein said movable support means includes first and second movement tables slidably movable in opposed directions relative to each other in said predetermined paths of travel defined by said first and second pairs of opposed guide members, respectively.

19. The reel table shifting device as in claim 18; wherein said driving means for moving said movable support means includes a drive motor, first and second belt and pulley means for synchronously moving said first and second movement tables, respectively, in opposed directions relative to each other along said predetermined paths of travel and coupling means for coupling said drive motor with said first and second belt and pulley means for driving said first and second belt and pulley means.

20. The reel table shifting device as in claim 19; wherein said coupling means for coupling said drive motor with said first and second belt and pulley means includes a worm driven by said motor and first and second worm gears meshing with said worm on opposite sides thereof so that said first and second worm gears rotate synchronously in opposed rotational directions to each other, said first and second belt and pulley means include first and second drive pulleys rotatably connected to said first and second worm gears, respectively, and first and second drive belts engaged with said first and second drive pulleys and being coupled with said first and second movement tables, respectively, to thereby provide synchronous movement of said first and second movement tables in opposed direction to each other along said predetermined paths of travel.

21. The reel table shifting device as in claim 20, wherein first and second drive pulleys are rotatably connected to said first and second worm gears by first and second rotary shafts, respectively.

22. The reel table shifting device as in claim 21; wherein said first and second shafts and drive pulleys also include aligning means for ensuring synchronous opposed movements of said first and second movement tables in said predetermined paths of travel.

23. The reel table shifting device as in claim 22; wherein said first and second shafts are angularly adjustable relative to said first and second worm gears, respectively, and said aligning means includes slots in said shafts engageable for adjusting each of said shafts and the drive pulley thereon angularly relative to the respective worm gear.

24. The reel table shifting device as in claim 20; and further including first connecting means for connecting said first belt to said first movement table, and second connecting means for operatively connecting said second belt to said second movement table.

25. The reel table shifting device as in claim 24; and further including direction sensor means for detecting the direction of movement of said first and second movement tables towards said third mount position.

26. The reel table shifting device as in claim 25; wherein said direction sensor means includes a first direction sensor mounted on said first movement table, a second direction sensor mounted on said second movement table, first shutter means mounted on said first connecting means and second shutter means mounted on said second connecting means, said first and second direction sensors being selectively opened and closed in accordance with the positions of said first and second shutter means, respectively, relative thereto.

27. The reel table shifting device as in claim 26; wherein, when said movable support means are moved from said first mount positions to said third mount positions, said first shutter means closes said first direction sensor.

28. The reel table shifting device as in claim 27; wherein, when said movable support means are moved from said second mount positions to said third mount positions, said second shutter means closes said second detection sensor.

29. The reel table shifting device as in claim 26; wherein said first and second direction sensors are photosensors.

30. The reel table shifting device as in claim 24; and further including biasing means for urging said stopper catch against said stopper when said movable support means is moved to said third mount position.

31. The reel table shifting device as in claim 30; wherein said biasing means includes a limiter spring provided in each of said first and second connecting means and which is compressible upon movement of said first and second belts after said movable support means attains said third mount position.

32. The reel table shifting device as in claim 31; wherein, when said movable support means is moved from said first mount position to said third mount position, said limiter spring urges said first angled surface of said stopper catch against said stopper to retain said movable support means in said third mount position.

33. The reel table shifting device as in claim 31; wherein, when said movable support means is moved from said second mount position to said third mount position, said limiter spring urges said second angled surface of said stopper catch against said stopper to retain said movable support means in said third mount position.

34. A reel table shifting device adapted to receive a tape cassette which is of relatively large, intermediate or small size, said reel table shifting device comprising:
reel table means for supporting said cassette of relatively small, intermediate size;
support means for rotatably mounting said reel table means;
guide means along which said support means is movable in a predetermined path;
drive means for moving said support means along said guide means in said predetermined path between a plurality of cassette mount positions including a first mount position, wherein said large-sized cassette can be supported on said reel table means, a second mount position, wherein said small-sized cassette can be supported on said reel table means, and a third mount position between said first and second positions, and wherein said intermediate-sized cassette can be supported on said reel table means;
means for physically blocking movement of said support means in said third mount position which is the same whether said support means is moved to said third mount position from either said first mount position or said second mount position; and
means for servo controlling said drive means during movement of said movable support means from one of said first and second mount positions to said third mount position.

35. A reel table shifting device adapted to receive a tape cassette which is of relatively large, intermediate or small size, said reel table shifting device comprising:
reel table means for supporting said cassette of relatively small, intermediate or large size;
support means for rotatably mounting said reel table means;
drive means for moving said support means between a plurality of cassette mount positions including a first mount position, wherein said large-sized cassette can be supported on said reel table means, a second mount position, wherein said small-sized cassette can be supported on said reel table means, and a third mount position between said first and second positions, and wherein said intermediate-sized cassette can be supported on said reel table means;
means for arresting movement of said support means in said third mount position from either of said first or second mount positions; and
servo control means for controlling said drive means in its movement of said support means from one of said first and second mount positions to said third mount position, including spring loaded means operatively connected between said support means and said drive means and being displaceable between a first normal position during said movement of said support means and a second deflected position upon the arresting of said movement of the support means in said third mount position, sensing means for detecting when said spring loaded means is displaced to said second deflected position, and means responsive to said detecting of displacement of said spring loaded means to said second deflected position for changing-over said servo control means from a first controlling condition to a second controlling condition.

36. The reel table shifting device as in claim 35; wherein, while said spring-loaded means is in said first normal position, said drive means is controlled to operate at a constant speed by said servo control means in said first controlling condition thereof.

37. The reel table shifting device as in claim 35; wherein, when said sensing means detects that said spring-loaded means has been displaced to said second deflected position, said drive means is controlled to operate at a constant torque by said servo control means in said second controlling condition thereof.

* * * * *